(No Model.)
T. A. ACY.
SEED
No. 422,931. Patented Mar. 11, 1890.
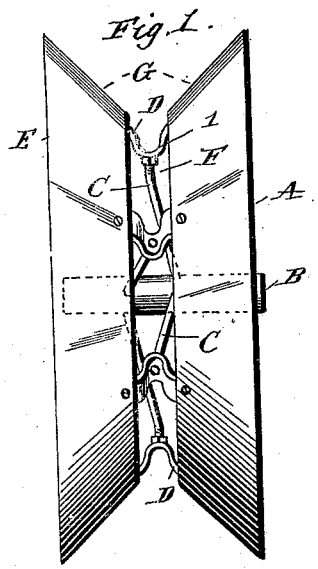
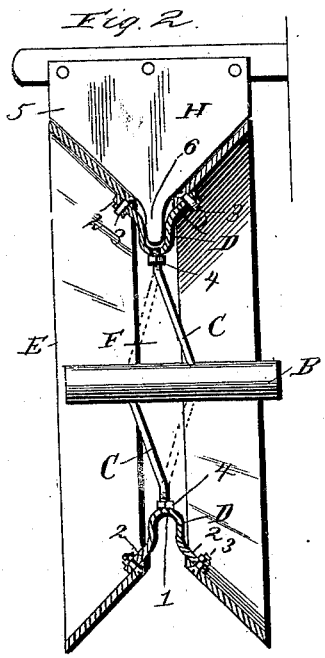
Witnesses
Wm T. Robertson
Kate P. Robertson
Inventors.
Thomas A. Galt
George S. Tracy
By
John G. Manahan
Their Attorney

UNITED STATES PATENT OFFICE.

THOMAS A. GALT AND GEORGE S. TRACY, OF STERLING, ILLINOIS.

SEED-PLANTER.

SPECIFICATION forming part of Letters Patent No. 422,931, dated March 11, 1890.

Application filed November 18, 1889. Serial No. 330,651. (No model.)

*To all whom it may concern:*

Be it known that we, THOMAS A. GALT and GEORGE S. TRACY, citizens of the United States, residing at Sterling, in the county of Whiteside and State of Illinois, have invented new and useful Improvements in Seed-Planters, of which the following is a specification.

Our invention relates to improvements in seed-planters, but has reference especially to that class of planters in which a wheel and its scraper having a tread of more or less width is utilized to cover the seed after it is deposited, and our invention pertains to a novel construction of such covering-wheel; and the objects of our invention are to provide a central opening around the entire circumference of the wheel, which will allow the earth to be loosely ridged directly over the line of the hills of seed, and thus be precluded from baking and be readily pervious to moisture, and to provide a scraper having a continuously-acting central prolongation adapted to project itself within the central opening aforesaid of said wheel and prevent the earth from accumulating therein. We attain these objects by the mechanism illustrated in the accompanying drawings, in which—

Figure 1 is an end elevation of a wheel embodying our invention. Fig. 2 is a sectional view thereof, with the scraper in suitable relation thereto.

As our invention is applicable to any corn or other seed planter in which a covering or pressure wheel is employed, and its application and operation in any of such forms of such organizations are obvious, we do not deem it necessary to show or describe other parts or any special form of seeder or planter, but will limit our description to the covering-wheel proper and its attendant scraper.

A is our improved wheel, consisting of the hub B, adapted in the usual mode to rotate on or with an axle or spindle and to support and carry such portion of the machine as may be desirable.

C C are radiating spokes attached in any suitable mode in or to the periphery of the hub B, and attached, adjustably or otherwise, at their outer ends to the center of the yokes D.

E is the rim of the wheel A, provided centrally with the peripheral opening F, intended to follow the line of the previously-deposited seed and intended to be of the width substantially of such deposits. In the wheel which we employ for corn-planting such opening is the width of two inches. The residue of the tread G of the wheel W is sloped in straight lines from the outer edges thereof, respectively, inwardly and toward the hub B at an angle of about forty-five degrees with the axis of the wheel, although the precise angle of such inclination is not material. The yokes D are provided with the central inward bow 1 and flat ends 2, parallel with and placed, respectively, in contact with the inner surface of the tread G on each side of the opening F, and are attached at each side of said opening to the tread G by means of radial rivets or countersunk bolts 3. The outer ends of the spokes C are screwed into the bow 1 of the yoke D and additionally secured in place by a nut 4; or said spokes may be attached to said yokes in any other suitable and obvious manner.

H is a scraper seated in any of the usual modes upon a convenient portion of the frame of the machine and provided with the usual scraping-face 5, adapted to be intermittently brought in contact with the tread G in any of the usual modes, and further provided with the central projection 6, adapted to be projected continuously a sufficient distance within the opening F to prevent the accumulation of earth therein, and to be intermittently thrown deeper into such opening sufficiently to permit the residue of said scraper to come in contact with the tread G aforesaid.

The advantages of our invention are that the centrally-inclined formation of the tread G tends to crush the clods upon the sides of the seed-row; also to gather the dirt centrally upon the seed-row from each side thereof sufficiently to insure the covering of the seed; also to leave the earth directly over the line of the seeds in the natural condition, and therefore not liable to the bake which usually occurs subsequently in the track of ordinary covering-wheels. The pressure aforesaid upon the sides of the row of seeds is sufficient to insure the germination of the latter, while the loose quality of the earth directly over the line of the seeds readily permits the passage of the seed-sprouts in their early and tender stage. The loose condition of the earth in the line of the passage of the opening F, and therefore directly over the seed-deposits, is also favorable to the reception of moisture.

What we claim as our invention, and desire to secure by Letters Patent of the United States, is—

In a seed-planter wheel, the combination of the hub B, staggered radiating spokes C C, yokes D, duplex inwardly-inclined tread G, peripheral opening F, and a scraper H, provided with the retracted surface 5, adapted, respectively, to scrape the treads G, and with a central elongation 6, projected into the opening F and adapted to keep the latter clear of accumulated earth and rubbish, substantially as shown, and for the purpose described.

In testimony whereof we affix our signatures in the presence of two witnesses.

THOMAS A. GALT.
GEO. S. TRACY.

Witnesses:
ADDA E. WARD,
JOHN G. MANAHAN.